(12) United States Patent
Lindenthal et al.

(10) Patent No.: US 12,240,480 B2
(45) Date of Patent: Mar. 4, 2025

(54) METHODS AND SYSTEMS FOR PROVIDING TRAILER GUIDANCE

(71) Applicant: GM GLOBAL TECHNOLOGY OPERATIONS LLC, Detroit, MI (US)

(72) Inventors: Steffen P. Lindenthal, Oshawa (CA);
Michael D. Alarcon, Markham (CA);
Akram M. Abdel-Rahman, Ajax (CA);
Norman J. Weigert, Whitby (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 55 days.

(21) Appl. No.: 18/338,699

(22) Filed: Jun. 21, 2023

(65) Prior Publication Data

US 2024/0425071 A1    Dec. 26, 2024

(51) Int. Cl.
| | |
|---|---|
| *B60W 50/14* | (2020.01) |
| *B60K 35/00* | (2024.01) |
| *B60K 35/28* | (2024.01) |
| *G06T 7/10* | (2017.01) |
| *G06V 20/56* | (2022.01) |

(52) U.S. Cl.
CPC ............. *B60W 50/14* (2013.01); *B60K 35/00* (2013.01); *G06T 7/10* (2017.01); *G06V 20/56* (2022.01); *B60K 35/28* (2024.01); *B60K 2360/173* (2024.01); *B60K 2360/176* (2024.01); *B60W 2050/146* (2013.01); *G06T 2207/30252* (2013.01)

(58) Field of Classification Search
CPC ............ B60W 50/14; B60W 2050/146; G06T 7/10; G06T 2207/30252; G06V 20/56; B60K 35/00; B60K 35/28; B60K 2360/176; B60K 2360/173
See application file for complete search history.

(56) References Cited

U.S. PATENT DOCUMENTS

| | | | |
|---|---|---|---|
| 2011/0058085 A1* | 3/2011 | Ito | H04N 23/667 348/E5.022 |
| 2013/0201323 A1* | 8/2013 | Davis | H04N 5/262 348/81 |
| 2014/0165898 A1* | 6/2014 | Cierpka | G01S 15/89 114/312 |
| 2016/0171664 A1* | 6/2016 | Komiya | G06T 5/50 382/275 |
| 2018/0114089 A1* | 4/2018 | Ikeda | G06V 10/22 |
| 2021/0229589 A1* | 7/2021 | Wright, III | G01F 23/00 |

* cited by examiner

*Primary Examiner* — Omer S Khan
(74) *Attorney, Agent, or Firm* — Lorenz & Kopf LLP

(57) ABSTRACT

Methods and systems are provided for providing guidance when reversing a vehicle towing a trailer. In one embodiment, a method includes: A method for providing guidance when reversing a vehicle towing a trailer, comprising: receiving, from a camera of the trailer, image data associated with an environment of the vehicle; determining, by a processor, that the camera of the trailer is at least one of partially and fully underwater; in response to the determining, determining, by the processor, at least one of underwater image data and underwater guideline data based on a correction factor associated with the water and the image data; and generating, by the processor, display data based on the at least one of underwater image data and underwater guidelines data.

20 Claims, 6 Drawing Sheets

METHODS AND SYSTEMS FOR PROVIDING TRAILER GUIDANCE

INTRODUCTION

The technical field generally relates to vehicles and, more specifically, to methods and systems for providing guidance to drivers of vehicles towing a trailer while reversing the vehicle.

Rear facing cameras may be used to assist drivers when reversing a trailer. For example, the rear facing cameras may provide images of a boat ramp as the vehicle is reversing the trailer down the ramp and into the water. In some instances, the rear facing camera may become submerged in the water. In such instances, the camera view is distorted. For example, obstacles in water appear closer than they are, causing a false sense of distance and size of the object in the pathway, and also causing a mismatch of any guidelines that may be displayed in the view.

Accordingly, it is desirable to provide methods and systems for providing guidance to drivers of vehicles towing trailer while reversing the vehicle at a ramp associated with water. Furthermore, other desirable features and characteristics of the present disclosure will become apparent from the subsequent detailed description and the appended claims, taken in conjunction with the accompanying drawings and this introduction.

SUMMARY

Methods and systems are provided for providing guidance when reversing a vehicle towing a trailer. In one embodiment, a method includes: receiving, from a camera of the trailer, image data associated with an environment of the vehicle; determining, by a processor, that the camera of the trailer is at least one of partially and fully underwater; in response to the determining, determining, by the processor, at least one of underwater image data and underwater guideline data based on a correction factor associated with the water and the image data; and generating, by the processor, display data based on the at least one of underwater image data and underwater guidelines data.

In various embodiments, the determining that the camera of the trailer is at least one of partially and fully underwater is based on an evaluation of the image data for at least one of, in at least a portion of the image data, low contrast, blur, inhomogeneous lighting, and color diminishing.

In various embodiments, the method includes determining a position of the camera of the trailer, and wherein the determining that the camera of the trailer is at least one of partially and fully underwater is based on the position of the camera of the trailer.

In various embodiments, the method includes determining a distance to travel for the camera to be underwater based on the position of the camera of the trailer, and wherein the determining that the camera of the trailer is at least one of partially and fully underwater is based on the distance to travel.

In various embodiments, further in response to the determining, determining whether the water is murky, and wherein the generating the display data is based on whether the water is murky.

In various embodiments, the determining whether the water is murky is based on an edge detection method of a defined object.

In various embodiments, when the water is determined not to be murky, determining at least one underwater feature; determining a location of the at least one underwater feature; and storing the at least one underwater feature and the location in a datastore.

In various embodiments, the method includes generating display data based on the at least one underwater feature and the location.

In various embodiments, the method includes communicating the at least one underwater feature and the location to a remote system for crowdsourcing.

In various embodiments, the generating the display data includes overlaying the underwater guideline data on the underwater image data.

In another embodiment, a system for providing guidance when reversing a vehicle towing a trailer includes: a computer readable medium configured to store parameters associated with the vehicle and the trailer; and a computer system onboard the vehicle and configured to, by a processor, receive, from a camera of the trailer, image data associated with an environment of the vehicle; determine that the camera of the trailer is at least one of partially and fully underwater; in response to the determining, determine at least one of underwater image data and underwater guideline data based on a correction factor associated with the water and the image data; and generate display data based on the at least one of underwater image data and underwater guidelines data.

In various embodiments, the computer system is configured to determine that the camera of the trailer is at least one of partially and fully underwater based on an evaluation of the image data for at least one of, in at least a portion of the image data, low contrast, blur, inhomogeneous lighting, and color diminishing.

In various embodiments, the computer system is configured to determine a position of the camera of the trailer, determine that the camera of the trailer is at least one of partially and fully underwater based on the position of the camera of the trailer.

In various embodiments, the computer system is further configured to determine a distance to travel for the camera to be underwater based on the position of the camera of the trailer, determine that the camera of the trailer is at least one of partially and fully underwater based on the distance to travel.

In various embodiments, the computer system is configured to, further in response to the determining, determine whether the water is murky, and generate the display data based on whether the water is murky.

In various embodiments, the computer system is configured to determine whether the water is murky based on an edge detection method of a defined object.

In various embodiments, the computer system is configured to, when the water is determined not to be murky, determine at least one underwater feature; determine a location of the at least one underwater feature; and store the at least one underwater feature and the location in a datastore.

In various embodiments, the computer system is configured to generate the display data based on the at least one underwater feature and the location.

In various embodiments, the computer system is configured to communicate the at least one underwater feature and the location to a remote system for crowdsourcing.

In various embodiments, the computer system is configured to generate the display data by overlaying the underwater guideline data on the underwater image data.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
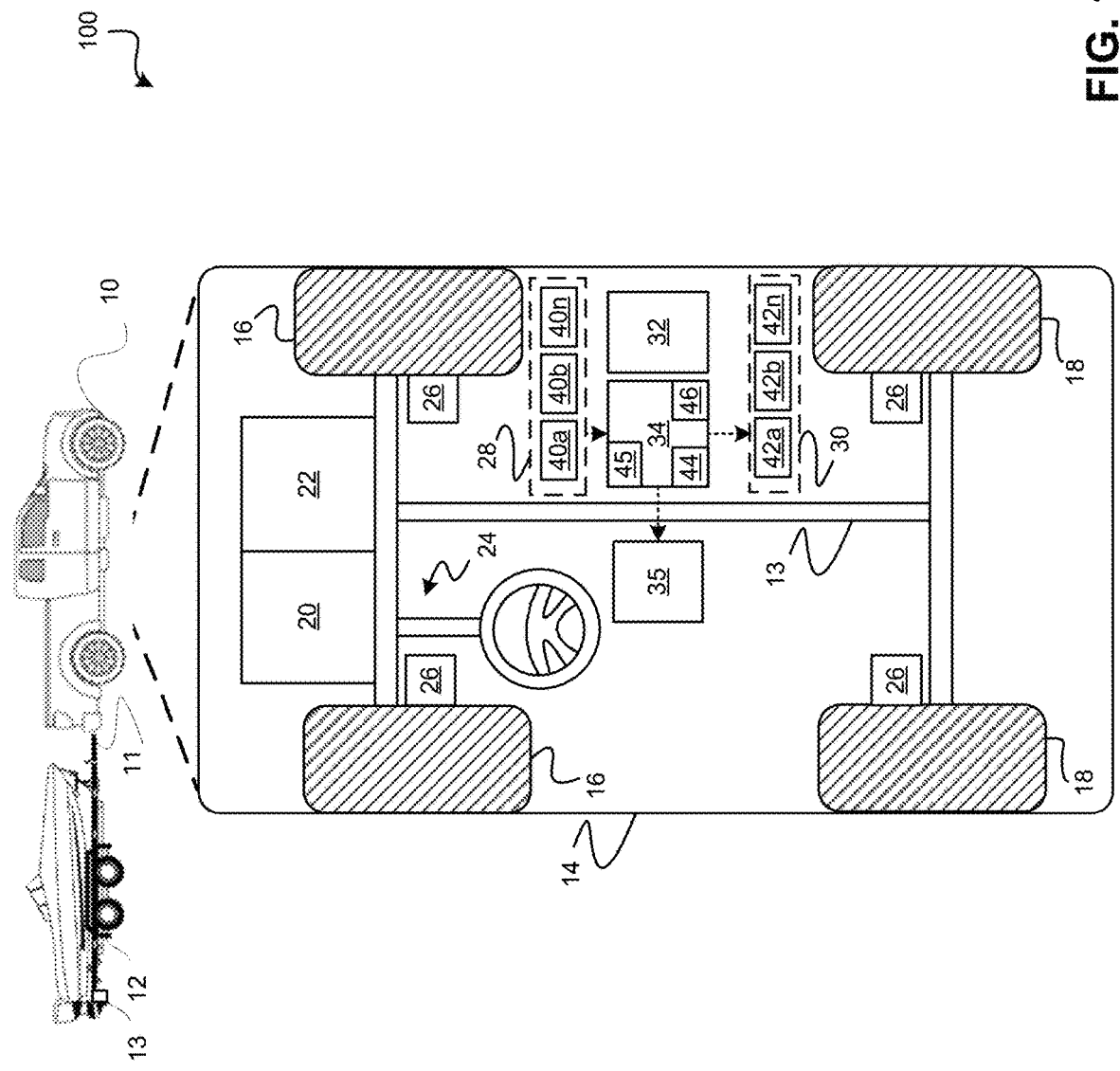
FIG. 1 is a functional block diagram of a vehicle that includes a guidance system for providing guidance when the vehicle is towing a trailer, in accordance with various embodiments.

With reference to FIG. 1, a guidance system shown generally at 100 is associated with a vehicle 10 and a trailer 12 in accordance with various embodiments. As can be appreciated, the trailer 12 may any type of towable application having one or more wheels and is not limited to any one embodiment. The vehicle 10 is configured to couple to and connect to the trailer 12 via a connection apparatus 11 and is configured to tow the trailer 12. In various embodiments, the connection apparatus 11 comprises a hitch. In various other embodiments, the connection apparatus 11 comprises one or more other types of systems, such as a gooseneck for a fifth wheel trailer, and so on. In various embodiments, the connection apparatus 11 further comprises a wiring harness configured to communicate power and/or communication signals to and from components of the trailer 12. As described in greater detail further below, the guidance system 100 includes a computer system configured to assist drivers of the vehicle 10 with reversing the trailer 12 by determining when a camera 13 associated with the vehicle 10 and/or the trailer 12 is underwater and by dynamically adjusting the display of imagery and trailer guidelines when the camera 13 is determined to be underwater.

In various embodiments, the vehicle 10 comprises an automobile. The vehicle 10 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD), and/or various other types of vehicles in certain embodiments. In various embodiments, the vehicle 10 may also comprise other types of mobile platforms capable of towing and is not limited to an automobile.

As depicted in FIG. 1, the exemplary vehicle 10 generally includes a chassis 15 a body 14, front wheels 16, and rear wheels 18. The body 14 is arranged on the chassis 15 and substantially encloses components of the vehicle 10. The body 14 and the chassis 15 may jointly form a frame. The wheels 16-18 are each rotationally coupled to the chassis 15 near a respective corner of the body 14.

The vehicle 10 generally includes a propulsion system 20, a transmission system 22, a steering system 24, a brake system 26, a sensor system 28, an actuator system 30, at least one data storage device 32, at least one controller 34, and a display system 35. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16-18 according to selectable speed ratios. According to various embodiments, the transmission system 22 may include a step-ratio automatic transmission, a continuously variable transmission, or other appropriate transmission. The brake system 26 is configured to provide braking torque to the vehicle wheels 16-18. The brake system 26 may, in various embodiments, include friction brakes, brake by wire, a regenerative braking system such as an electric machine, and/or other appropriate braking systems. The steering system 24 influences a position of the of the vehicle wheels 16-18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior and/or interior environment of the vehicle 10 and/or of the vehicle 10 itself. The sensing devices 40a-40n can include, but are not limited to, radars, lidars, global positioning systems (GPS), optical cameras, thermal cameras, ultrasonic sensors, inertial measurement units (IMU), pressure sensors, position sensors, speed sensors, and/or other sensors. In various embodiments, the sensor system 28 includes the camera 13 configured to sense an environment at or near a rear portion of the vehicle 10 and/or trailer 12 and to generate image data based thereon.

The actuator system 30 includes one or more actuator devices 42a-42n that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as air, music, lighting, etc. (not numbered).

The data storage device 32 stores data for use in controlling the vehicle 10. In various embodiments, the data storage device 32 stores defined values for controlling the vehicle 10 and/or making computations in order to control the vehicle 10. As can be appreciated, the data storage device 32 may be part of the controller 34, separate from the controller 34, or part of the controller 34 and part of a separate system.

The controller 34 includes at least one processor 44, a communication bus 45, a computer readable storage device or media 46. The processor 44 can be any custom made or commercially available processor, a central processing unit (CPU), a graphics processing unit (GPU), an auxiliary processor among several processors associated with the controller 34, a semiconductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10. The bus 45 serves to transmit programs, data, status and other information or signals between the various components of the vehicle 10 and/or the trailer 12. The bus 45 can be any suitable physical or logical means of connecting computer systems and components. This includes, but is not limited to, direct hard-wired connections, fiber optics, infrared, and wireless bus technologies.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although only one controller 34 is shown in FIG. 1, embodiments of the vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the vehicle 10.

Figure 2:
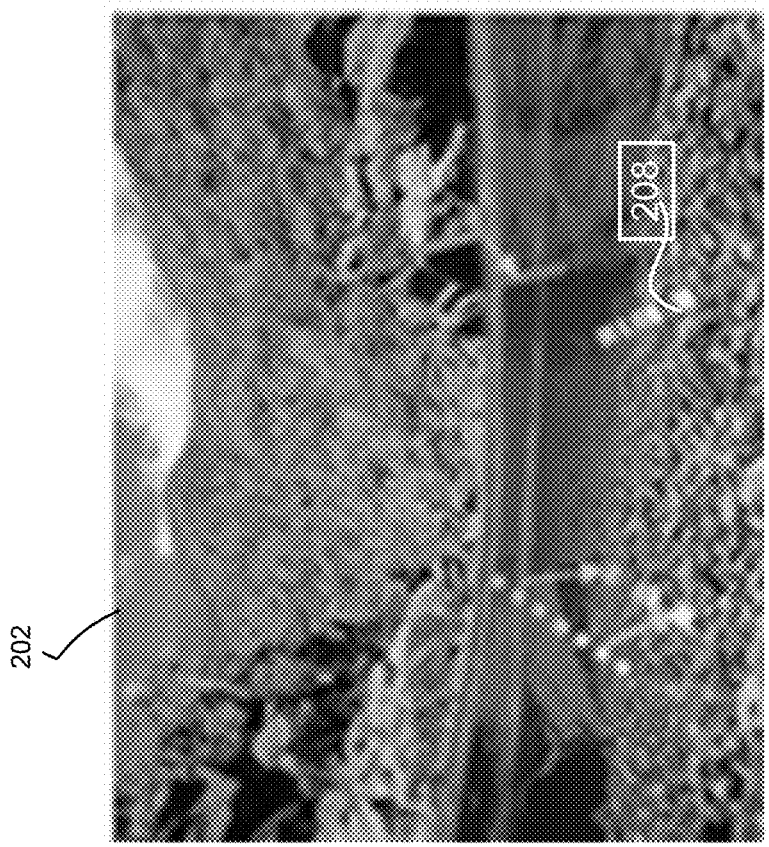
FIG. 2 is an interface illustrating elements presented by the guidance system in order to provide guidance, in accordance with various embodiments.

In various embodiments, one or more instructions of the controller 34 are embodied in the guidance system 100 and, when executed by the processor 44, receive data from the sensor system 28 and process the data in order to generate display data for display by a display system 35. In various embodiments, as shown in FIG. 2, the display data 200 includes image data 202 from the camera 13 as well as dynamically determined trailer guidelines 208 presented as an overlay on the image data 202. As will be discussed in more detail below; the image data 202 and the position of the trailer guidelines 208 relative to the image data 202 are dynamically determined and displayed based on whether the camera 13 is underwater. As can be appreciated, the trailer guidelines 208 include markings such as a straight line and/or curves having features such as color, thickness, appearance, etc. that illustrate the path the trailer 12 is following. The trailer guidelines 208 include markings such as a curved arrow having features such as color, thickness, appearance, rate of display, etc. that illustrate an anticipated change in the hitch angle and the direction the trailer 12 would follow given the steering input and the vehicle velocity. The features (color, thickness, appearance, etc.) of the trailer guidelines 208 may be dynamically adjusted (e.g., color change, line thickness change, faster rate of display, etc.) to further illustrate the anticipated rate of change and direction of the trailer 12.

As can be appreciated, the controller 34 and the image data 202 may otherwise differ from the embodiment depicted in FIGS. 1 and 2. For example, the controller 34 may be coupled to or may otherwise utilize one or more remote computer systems and/or other control systems, for example as part of one or more of the above-identified vehicle devices and systems. It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 44) to perform and execute the program. Such a program product may take a variety of forms, and the present disclosure applies equally regardless of the particular type of computer-readable signal bearing media used to carry out the distribution. Examples of signal bearing media include recordable media such as floppy disks, hard drives, memory cards and optical disks, and transmission media such as digital and analog communication links. It will be appreciated that cloud-based storage and/or other techniques may also be utilized in certain embodiments. It will similarly be appreciated that the computer system of the controller 34 may also otherwise differ from the embodiment depicted in FIG. 1, for example in that the computer system of the controller 34 may be coupled to or may otherwise utilize one or more remote computer systems and/or other control systems.

Figure 3:
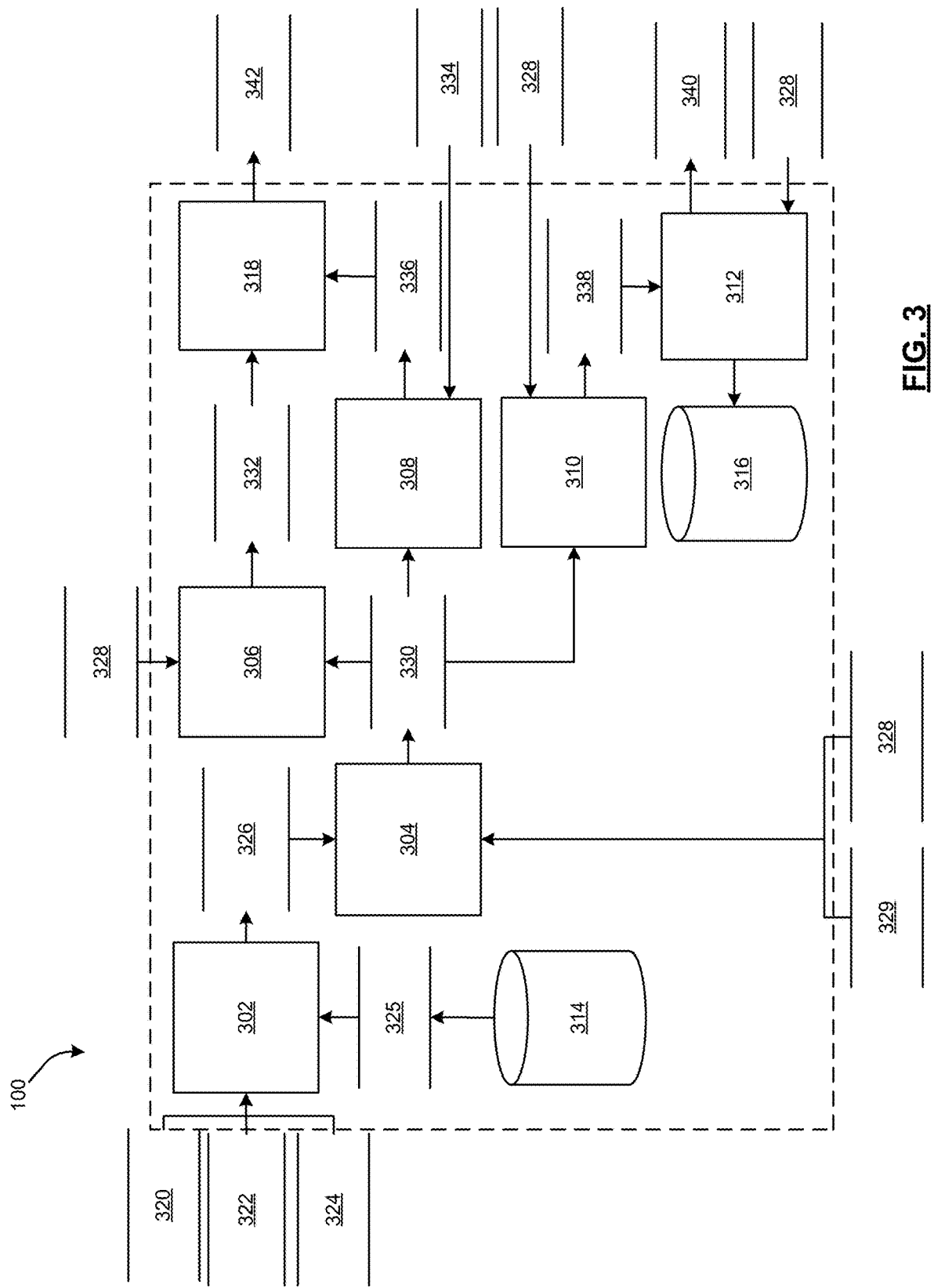
FIG. 3 is a dataflow diagram illustrating the guidance system of the vehicle, in accordance with various embodiments.

With reference now to FIG. 3 and with continued reference to FIGS. 1 and 2, a dataflow diagram illustrates elements of the guidance system 100 of FIG. 1 in accordance with various embodiments. As can be appreciated, various embodiments of the guidance system 100 according to the present disclosure may include any number of modules embedded within the controller 34 which may be combined and/or further partitioned to similarly implement systems and methods described herein. Furthermore, inputs to the guidance system 100 may be received from the sensor system 28, received from other control modules (not shown) associated with the vehicle 10, and/or determined/modeled by other sub-modules (not shown) within the controller 34 of FIG. 1. Furthermore, the inputs might also be subjected to preprocessing, such as sub-sampling, noise-reduction, normalization, feature-extraction, missing data reduction, and the like.

In various embodiments, the guidance system 100 includes a camera position determination module 302, a camera underwater determination module 304, an image data correction module 306, a guidelines data correction module 308, a murky water determination module 310, a feature determination module 312, a feature data datastore 316, a parameter data datastore 314, and a display module 318.

In various embodiments, the parameter data datastore 314 stores parameter data 325 associated with the vehicle 10, the trailer 12, and/or the camera 13. For example, the parameter data datastore 314 stores intrinsic and/or extrinsic parameters associated with the components for use in the location computations as discussed below.

In various embodiments, the camera position determination module 302 receives as input vehicle orientation data (e.g., IMU data and/or GPS data) 320, trailer orientation data 322 (e.g., hitch articulation angle), and camera orientation data 324 (e.g., configured position relative to the vehicle 10 or trailer 12). The camera position determination module 302 determines the actual position of the camera 13 as the vehicle 10 and trailer 12 reverse down the ramp and generates camera position data 326 based thereon.

For example, when the camera 13 is located on the rear of the trailer 12, the camera position determination module 302 determines the position in world coordinates as a summation of the GPS location of the vehicle 10, the IMU orientation of the vehicle 10, the trailer orientation relative to the vehicle 10 as indicated by the hitch angle, and the camera orientation relative to the trailer 12.

In various embodiments, the camera underwater determination module 304 receives as input image data 328 from the camera 13, waterline data 329, and the camera position data 326. In various embodiments, the waterline data 329 may be provided by a user setting the location where the water meets the pavement using a movable line on an image that is displayed. In various other embodiments, the waterline may be received from a remote system that stores waterline data based on the day and time associated with the location, and/or may be determined by other means.

In various embodiments, the camera underwater determination module 304 determines whether the camera 13 is underwater or partially underwater and generates underwater data 330 based thereon. For example, the camera underwater determination module 304 determines whether the camera 13 is partially or fully underwater based on image processing techniques that identify, for example, that the image data 328 shows in at least a portion of the image a low contrast, blur, inhomogeneous lighting, and/or color diminishing of the images. When the entire image shows at least one of or any combination of low contrast, blur, inhomogeneous lighting, and/or color diminishing, then the camera underwater determination module 304 determines that the camera 13 is fully underwater. When only a portion (e.g., the bottom portion) of the image shows at least one of or any combination of low contrast, blur, inhomogeneous lighting, and/or color diminishing, then the camera underwater determination module 304 determines that the camera 13 is partially underwater and stores an identification of the part of the image that is deemed to be underwater.

Figure 4:
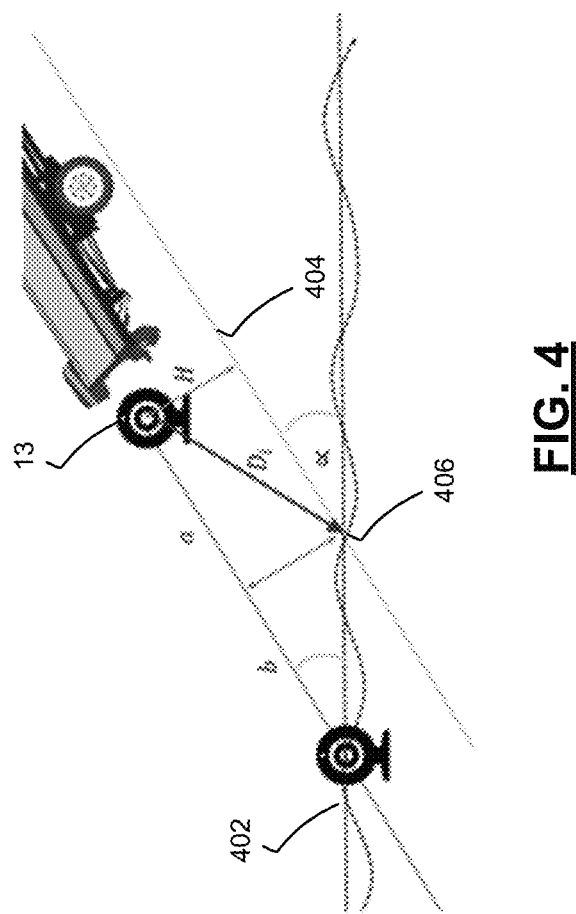
FIG. 4 is a side view of the vehicle and the trailer reversing down a ramp and illustrating various parameters used by the guidance system, in accordance with various embodiments.

In another example, the camera underwater determination module 304 determines whether the camera 13 is underwater or partially underwater based on whether the camera position as indicated by the camera position data 326 has reached or passed a determined location or locations along the water. For example, as shown in more detail in FIG. 4, using trailer dimensions, camera extrinsic parameters, and/or vehicle dynamics, the camera underwater determination module 304 determines a distance or distances to travel $D_{travel}$ for the camera 13 to be partially or fully submerged in the water as:

$$D_{travel} = a + b,$$

where $$a = \sqrt{H^2 + D_i^2}, \text{ and}$$

$$b = \frac{H}{\tan(\alpha)^{-1}}, \text{ and}$$

where H represents the height of the camera 13 from the ground 404, and a represents the angle the inclination angle of the ramp, $D_i$ represents the coordinate vector/distance of the point i 406 describing the location of the waterline 402 meeting the pavement in the mapping frame (e.g., as indicated by the user on the interface) as:

$$D_i = s_i(R_{TVC}^{MAP} * + CSM_i^T), CSM_{Tr} = R_{CSM}^{TVC} r_i^{CSM} + t_{TVC}^{CSM},$$

where $s_i$ represents a scale factor, determined by time differential stereo techniques (e.g., SLAM), assuming camera intrinsic values include correction for underwater refraction, $R_{TVC}^{MAP}$ represents the differential rotations (boresight, camera extrinsics) between the trailer rear view camera (TVC) and the trailer body frame (TRB), determined by calibration, and $CSM_i^T$ and $CSM_{Tr}$ represents the transformation, i.e., the translation and rotation, from the Center Stack Module (CSM) display interface frame to the trailer rear view camera frame.

With reference back to FIG. 3, the camera underwater determination module 304 then compares the computed distance to travel to an actual distance travelled by the camera 13 (determined from the camera position data 326) to determine whether the camera 13 is fully underwater or partially underwater and generates underwater data 330 based thereon. As can be appreciated, in various embodiments, the camera underwater determination module 304 evaluates the image data 328 as discussed above in addition to or as an alternative to evaluating the distance travelled as discussed above in order to determine whether the camera 13 is underwater.

In various embodiments, the image data correction module 306 receives as input the underwater data 330, and the image data 328. When the underwater data 330 indicates that the camera 13 is partially or fully underwater, the image data correction module 306 applies a correction factor to the image data 328 to correct a distortion effect that water has on the image data 328. For example, fresh water and saltwater have a same or similar refraction effect, approximately thirty-three percent more than air. Thus, objects appear thirty-three percent larger in the center of the image and even greater than thirty-three percent larger on the outskirts of the image. In various embodiments, the image data correction module 306 determines a single correction factor for the camera 13 and for all types of water. The image data correction module 306 then applies the correction factor to pixels of the image data 328 associated with the part of the camera 13 that is underwater to generate underwater image data 332. Thus, the image data having the part underwater is corrected for the distortion.

For example, the image data correction module 306 determines, for each pixel determined to be underwater, a corrected pixel as:

$$x_{distorted} = x(1 + (k_{1,air} + k_{1,water}) * r^2 + (k_{2,air} + k_{2,water}) * r^4 + k_{3-air} * r^6), \text{ and}$$

$$y_{distorted} = x(1 + (k_{1,air} + k_{1,water}) * r^2 + (k_{2,air} + k_{2,water}) * r^4 + k_{3-air} * r^6),$$

where $x_{distorted}$, $y_{distorted}$ represent the corrected for distortion x, y coordinate of the pixel, and $r^2 = x^2 + y^2$, where x, y represent the undistorted pixel locations in normalized image coordinates. $k_{1,air}$, $k_{2,air}$, $k_{3,air}$ represent the radial lens distortion coefficients associated with outside air. $k_{1,water}$, $k_{2,water}$, represent the additional radial distortion coefficients correcting for the effects of water.

In various embodiments, the guidelines data correction module 308 receives as input the underwater data 330, and initial guideline data 334. In various embodiments, the initial guideline data 334 indicates an initial position, color, shape, or other feature of guidelines relative to the image. Such guidelines may be determined, for example, based on a yaw rate of the vehicle 10 and/or a determined hitch angle. The guidelines data correction module 308 corrects a position of the initial guidelines presented to the user when the underwater data indicates that the camera 13 is fully or partially underwater and generates underwater guideline data 336 based thereon.

For example, the guidelines data correction module 308 applies a correction factor to the initial guideline data 334 similar to, for example, the correction factor discussed above such that the guidelines that are displayed in the underwater portion of the image are shrunken to fall into place with the underwater image data 332.

In various embodiments, the murky water determination module 310 receives as input the underwater data 330, and the image data 328. When the underwater data 330 indicates that the camera 13 is fully or partially underwater, the murky water determination module 310 determines whether the water is murky, or not clear enough to identify features on the ground or floating in the water and sets water data 338 based thereon. For example, the murky water determination module 310 processes the image data 328 to classify known objects with defined edges in the image. For example, concrete ridges, rocks, or an element of the trailer 12 may be a classified object identified within the image.

The murky water determination module 310 further processes the image data 328 of the detected object using an edge/corner detection to determine if the water is murky. For example, when the edge/corner data falls within a range and/or with a threshold confidence, then the murky water determination module 310 determines that the water is not murky and sets the water data 338 to indicate such. When the edge/corner data falls outside of the range and/or below a threshold confidence, then the murky water determination module 310 determines that the water is murky and sets the water data 338 to indicate such.

In various embodiments, the feature determination module 312 receives as input the water data 338, and the image data 328. When the water data 338 indicates that the water is not murky, the feature determination module 312 determines features of the ground (e.g., large rock, tree stump, pothole, etc.) or features in the water (e.g., floating dock, buoy, poles, lines, etc.) based on image processing and classification methods that evaluate the image data 328. When an object is identified, the feature determination module 312 computes a location of the object or feature.

Figure 5:
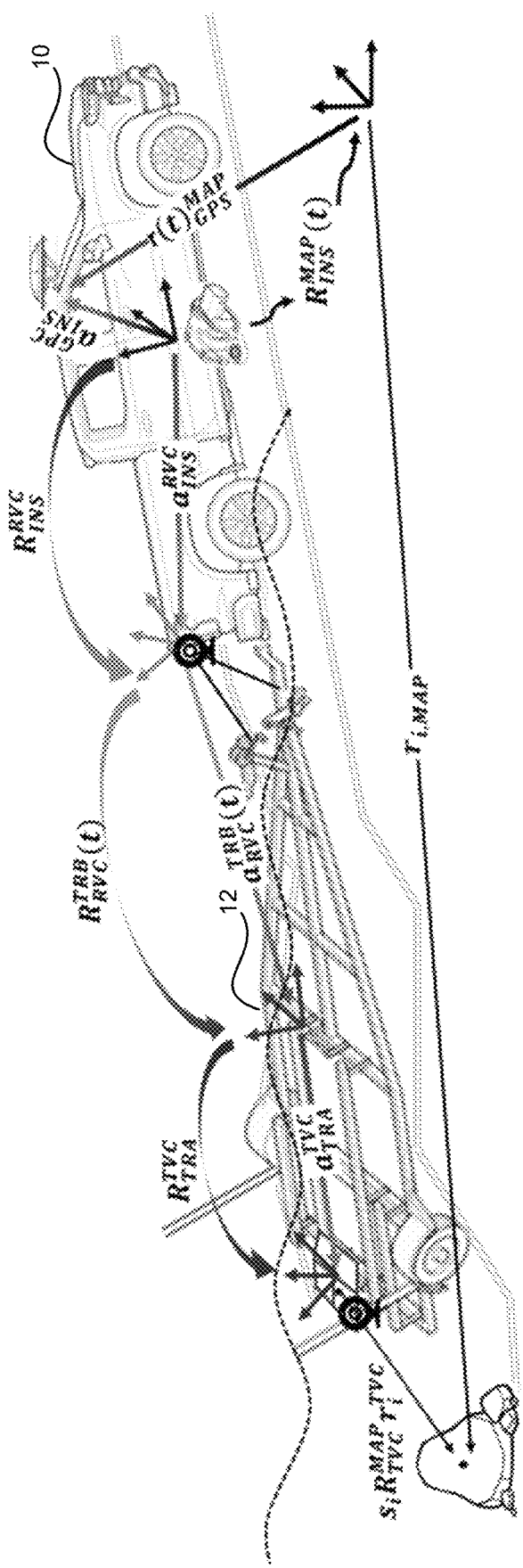
FIG. 5 is a side perspective view of the vehicle and the trailer in relation to an identified feature and illustrating various parameters used by the guidance system, in accordance with various embodiments.
Figure 6:
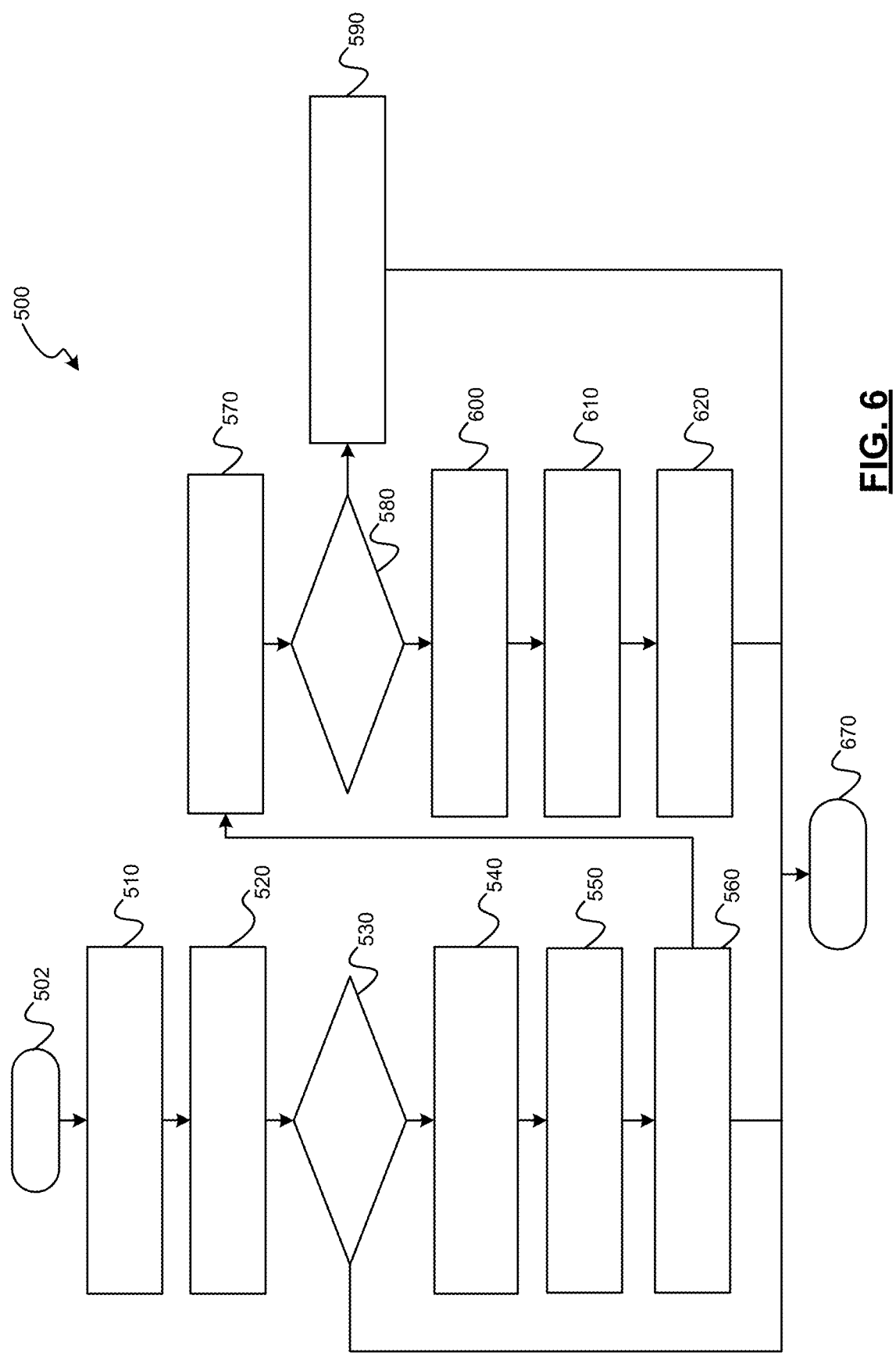
FIG. 6 is a flowchart of a process for providing guidance as performed by the guidance system of the vehicle, in accordance with exemplary embodiments.

For example, as shown in FIG. 5, the feature determination module 312 determines the location of the classified feature as:

$$r_i^{MAP} = r(t)_{GPS}^{MAP} + R_{INS}^{MAP}(t) * \left( \left( s_i R_{TVC}^{MAP} r_i^{TVC} + a_{TRA}^{TVC} \right) * \left( R_{RVC}^{TRA}(t) + a_{RVC}^{TRA}(t) \right) \right) * R_{INS}^{RVC} + a_{INS}^{RVC} - a_{INS}^{GPS} ),$$

where $r_i^{MAP}$ represents the coordinate vector of point (i) in the mapping frame (MAP). $r(t)_{GPS}^{MAP}$ represents the interpolated coordinate vector of global positioning system (GPS) in the MAP frame. $R_{INS}^{MAP}(t)$ represents the interpolated rotation matrix between the navigation sensor body frame (IMU) and the mapping frame (MAP). (t) represents the time of exposure or the time of capturing the images (e.g., determined by synchronization). $s_i$ represents a scale factor (e.g., determined by time differential stereo techniques (SLAM)), assuming camera intrinsic values include correction for underwater refraction. $R_{TVC}^{MAP}$ represents the differential rotations (e.g., boresight, camera extrinsic values, etc.) between the trailer rear view camera (TVC) and the trailer body frame (TRB) (e.g., that may be predefined). $r_i^{TVC}$ represents the coordinate vector of the point (i) in the TVC camera frame (i.e., image coordinates). $\alpha_{TRB}^{TVC}$ represents the lever arm vector between the trailer body frame (TRB) and the trailer view camera (TVC) (e.g., determined by measurement and/or predefined). $R_{RVC}^{TRB}(t)$ represents the rotations between the vehicle rear view camera (RVC) and the trailer body frame (TRB), determined by the photogrammetric means from RVC imagery and optionally additional measurements from the vehicle rear facing ultrasonic sensors. $\alpha_{RVC}^{TRA}(t)$ represents the lever arm vector between the vehicle rear view camera (RVC) and the trailer body frame (TRB), which may be computed from known RVC position and known trailer dimensions and the orientation of the trailer body with respect to RVC $R_{RVC}^{TRB}(t)$. $R_{INS}^{RVC}$ represents the differential rotation (e.g., boresight, camera extrinsic values, etc.) between the vehicle new camera (TVC) and the vehicle body frame, reduced to the INS location (INS), (e.g., determined by measurement and/ or predefined). $\alpha_{INS}^{RVC}$ represents the lever arm vector between the INS center and the RVC camera, determined from the vehicle. $\alpha_{INS}^{GPS}$ represents the lever arm vector between the INS center and the GPS antenna center, determined from the vehicle.

With reference back to FIG. 3, in various embodiments, the feature determination module 312 stores the classified object or feature and location as a map of feature data 340 in the feature data datastore 316 and/or communicates the feature data 340 to a remote system for crowdsourcing purposes.

In various embodiments, the display module 318 receives as input the underwater image data 332, and the underwater guideline data 336. The display module 318 generates display data 342 that includes the underwater guideline data 336 overlayed on the underwater image data 332, for example, as shown in FIG. 2. In various embodiments, optionally, the water data 338 and/or the feature data 340 are incorporated into the display data 342 to be displayed in text and/or graphic format as notifications along with the underwater image data 332 and the underwater guideline data 336.

With reference now to FIG. 5 and with continued reference to FIGS. 1-4, a flowchart is provided of a method 500 for providing guidance to a user of a vehicle 10 towing a trailer 12 as performed by the guidance system 100, in accordance with exemplary embodiments. As can be appreciated in light of the disclosure, the order of operation within the method 500 is not limited to the sequential execution as illustrated in FIG. 5 but may be performed in one or more varying orders as applicable and in accordance with the present disclosure. In various embodiments, the method 500 can be scheduled to run based on one or more predetermined events, and/or can run continuously during operation of the vehicle 10.

As can be appreciated, the various parameters are pre-stored in the parameter data datastore 314 while the vehicle 10 is not towing the trailer 12 or when the trailer 12 is first coupled to the vehicle 10.

In one example, the method 500 may begin at 502. The position and orientation of the camera 13 are determined at 510. Thereafter, the distance to travel is computed at 520 and used to determine whether the camera 13 is underwater at 530. When it is determined that the camera 13 is partially or fully underwater at 530, the image data determined to underwater is corrected for distortion at 540; and the guidelines are corrected to accommodate the distortion at 550. The image view is then generated for display based on the corrected imagery and guidelines at 560. Thereafter, the method 500 may end at 670 and/or continue at 570 where the image data is evaluated to determine murkiness of the water.

When the water is determined to be murky at 580, a notification is generated to be displayed indicating such at 590, for example, as a notification with the image data. Thereafter, the method 500 may end at 670.

When the water is determined to be not murky at 580, underwater ground characteristics are identified at 600, an actual location of the characteristic is determined, for example, as discussed above at 610, and the associated characteristic and location data is stored and/or communicated to a remote location or other vehicles at 620. The characteristics and geolocations may then be associated with a general geolocation such as, but not limited to, a boat launch location, a particular ramp, etc. and stored and/or communicated to a remote system for crowdsourcing. Thereafter, the method 500 may end at 670.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for providing guidance when reversing a vehicle towing a trailer, comprising:
   receiving, from a camera of the trailer, image data associated with an environment of the vehicle, wherein the image data comprises a plurality of pixels and a location of each of the plurality of pixels is defined by x, y, coordinates;
   determining, by a processor, a computed travel distance ($D_{travel}$) of the camera;
   determining, by the processor, an actual travel distance of the camera;
   comparing, by the processor, the computed travel distance to the actual travel distance; and
   determining, by the processor, that the camera of the trailer is at least one of partially and fully underwater based on the comparison;
   in response to the determining,
      determining, by the processor, underwater pixels of the plurality of pixels of the image data associated with an underwater portion of the image data;
      generating, by the processor, underwater image data comprising a plurality of corrected x, y coordinates for each of the underwater pixels using a first equation and a second equation,
      wherein the first equation is:

$$x_{distorted} = x(1+(k_{1,air}+k_{1,water})*r^2+(k_{2,air}+k_{2,water})*r^4+k_{3,air}*r^6),$$

the second equation is:

$$y_{distorted} = y(1+(k_{1,air}+k_{1,water})*r^2+(k_{2,air}+k_{2,water})*r^4+k_{3,air}*r^6),$$

wherein:
      $x_{distorted}$ and $y_{distorted}$ are the corrected x, y coordinates of each of the underwater pixels,
      $r^2=x^2+y^2$, where the x, y coordinates are undistorted pixel locations in normalized image coordinates,
      $k_{1,air}$, $k_{2,air}$, $k_{3,air}$ are radial lens distortion coefficients associated with outside air, and
      $k_{1,water}$, $k_{2,water}$ are radial distortion coefficients correcting for effects of water;
      determining, by the processor, initial guidelines data based on a yaw rate of the vehicle and a hitch angle;
      applying a correction factor to the initial guidelines data to generate underwater guidelines data; and
      generating, by the processor, display data based on the at least one of the underwater image data and the underwater guidelines data.

2. The method of claim 1, wherein the determining that the camera of the trailer is at least one of partially and fully underwater is based on an evaluation of the image data for at least one of, in at least a portion of the image data, low contrast, blur, inhomogeneous lighting, and color diminishing.

3. The method of claim 1, further comprising determining a position of the camera of the trailer, and wherein the determining that the camera of the trailer is at least one of partially and fully underwater is based on the position of the camera of the trailer.

4. The method of claim 1, further comprising determining the computed travel distance for the camera to be underwater based on a position of the camera of the trailer.

5. The method of claim 1, further comprising determining whether the water is murky, and wherein the generating the display data is based on whether the water is murky.

6. The method of claim 1, further comprising determining whether the water is murky is based on an edge detection method of a defined object.

7. The method of claim 1, further comprising:
determining whether the water is not murky; and
upon a determination that the water is not murky,
  determining at least one underwater feature;
  determining a location of the at least one underwater feature; and
  storing the at least one underwater feature and the location in a datastore.

8. The method of claim 7, further comprising generating display data based on the at least one underwater feature and the location.

9. The method of claim 1, wherein the generating the display data comprises overlaying the underwater guidelines data on the underwater image data.

10. The method of claim 1, further comprising:
determining the computed travel distance ($D_{travel}$) of the camera using a third equation, the third equation being:

$$D_{travel} = a+b,$$

wherein $$a = \sqrt{H^2 + D_i^2}, \text{ and } b = \frac{H}{\tan(\alpha)^{-1}},$$

and
wherein H is a height of the camera from ground, and α is an inclination angle of a ramp, and $D_i$ is determined using a fourth equation, the fourth equation being:

$$D_i = s_i(R_{TVC}^{MAP} * + CSM_i^T), CSM_{Tr} = R_{CSM}^{TVC} r_i^{CSM} + t_{TVC}^{CSM},$$

wherein:
  $s_i$ is a scale factor, determined by a time differential stereo technique based on an assumption camera intrinsic values include correction for underwater refraction,
  $R_{TVC}^{MAP}$ is differential rotations between the camera and a trailer body frame determined by calibration, and
  $CSM_i^T$ and $CSM_{Tr}$ are transformations based on a translation and rotation from a center stack module display interface frame to a camera frame of the camera.

11. A system for providing guidance when reversing a vehicle towing a trailer, comprising:
a computer readable medium configured to store parameters associated with the vehicle and the trailer; and
a computer system onboard the vehicle and configured to, by a processor,
  receive, from a camera of the trailer, image data associated with an environment of the vehicle, wherein the image data comprises a plurality of pixels and a location of each of the plurality of pixels is defined by x, y, coordinates;
  determine a computed travel distance ($D_{travel}$) of the camera;
  determine an actual travel distance of the camera;
  compare the computed travel distance to the actual travel distance; and
  determine that the camera of the trailer is at least one of partially and fully underwater based on the comparison;
  in response to the determining,
    determine underwater pixels of the plurality of pixels of the image data that are associated with an underwater portion of the image data;
    generate underwater image data comprising a plurality of corrected x, y coordinates for each of the underwater pixels using a first equation and a second equation,
    wherein the first equation is:

$$x_{distorted} = x(1+(k_{1,air}+k_{1,water})*r^2+(k_{2,air}+k_{2,water})*r^4+k_{3,air}*r^6),$$

the second equation is:

$$y_{distorted} = y(1+(k_{1,air}+k_{1,water})*r^2+(k_{2,air}+k_{2,water})*r^4+k_{3,air}*r^6),$$

wherein:
      $x_{distorted}$ and $y_{distorted}$ are the corrected x, y coordinates of each of the underwater pixels,
      $r^2 = x^2+y^2$, where the x, y coordinates are undistorted pixel locations in normalized image coordinates,
      $k_{1,air}$, $k_{2,air}$, $k_{3,air}$ are radial lens distortion coefficients associated with outside air, and
      $k_{1,water}$, $k_{2,water}$ are radial distortion coefficients correcting for effects of water;
    determining, by the processor, initial guidelines data based on a yaw rate of the vehicle and a hitch angle;
    applying a correction factor to the initial guidelines data to generate underwater guidelines data; and
    generate display data based on the at least one of the underwater image data and the underwater guidelines data.

12. The system of claim 11, wherein the computer system is configured to determine that the camera of the trailer is at least one of partially and fully underwater based on an evaluation of the image data for at least one of, in at least a portion of the image data, low contrast, blur, inhomogeneous lighting, and color diminishing.

13. The system of claim 11, wherein the computer system is configured to determine a position of the camera of the trailer, determine that the camera of the trailer is at least one of partially and fully underwater based on the position of the camera of the trailer.

14. The system of claim 11, wherein the computer system is further configured to determine the computed travel distance for the camera to be underwater based on a position of the camera of the trailer.

15. The system of claim 11, wherein the computer system is configured to determine whether the water is murky, and generate the display data based on whether the water is murky.

16. The system of claim 11, wherein the computer system is configured to determine whether the water is murky based on an edge detection method of a defined object.

17. The system of claim 11, wherein the computer system is configured to:
determine whether the water is not murky; and
upon a determination that the water is not murky:
  determine at least one underwater feature;
  determine a location of the at least one underwater feature; and
  store the at least one underwater feature and the location in a datastore.

18. The system of claim 17, wherein the computer system is configured to generate the display data based on the at least one underwater feature and the location.

19. The system of claim 11, wherein the computer system is configured to generate the display data by overlaying the underwater guidelines data on the underwater image data.

20. The system of claim 11, wherein the computer system is configured to:
   determine the computed travel distance ($D_{travel}$) of the camera using a third equation, the third equation being:

$$D_{travel} = a + b,$$

wherein $$a = \sqrt{H^2 + D_i^2}, \text{ and } b = \frac{H}{\tan(\alpha)^{-1}},$$

and
   wherein H is a height of the camera from ground, and a is an inclination angle of a ramp, and $D_i$ is determined using a fourth equation, the fourth equation being:

$$D_i = s_i(R_{TVC}^{MAP} * + CSM_i^T), CSM_{Tr} = R_{CSM}^{TVC} r_i^{CSM} + t_{TVC}^{CSM},$$

wherein:
   $s_i$ is a scale factor, determined by a time differential stereo technique based on an assumption camera intrinsic values include correction for underwater refraction,
   $R_{TVC}^{MAP}$ is differential rotations between the camera and a trailer body frame determined by calibration, and
   $CSM_i^T$ and $CSM_{Tr}$ are transformations based on a translation and rotation from a center stack module display interface frame to a camera frame of the camera.

* * * * *

UNITED STATES PATENT AND TRADEMARK OFFICE
CERTIFICATE OF CORRECTION

PATENT NO. : 12,240,480 B2  
APPLICATION NO. : 18/338699  
DATED : March 4, 2025  
INVENTOR(S) : Lindenthal et al.

Page 1 of 1

It is certified that error appears in the above-identified patent and that said Letters Patent is hereby corrected as shown below:

In the Claims

Claim 10 - Column 13, Line 38 - the formula should read:

$$D_i = s_i (R_{TVC}^{NAP} * + CSM_i^T), \ CSM_{Tr} = R_{CSM}^{TVC} \tau_i^{CSM} + t_{TVC}^{CSM}$$

Claim 20 - Column 16, Line 6 - the formula should read:

$$D_i = s_i (R_{TVC}^{NAP} * + CSM_i^T), \ CSM_{Tr} = R_{CSM}^{TVC} \tau_i^{CSM} + t_{TVC}^{CSM}$$

Signed and Sealed this  
Second Day of September, 2025

Coke Morgan Stewart  
*Acting Director of the United States Patent and Trademark Office*